(12) United States Patent
Linne et al.

(10) Patent No.: US 10,259,182 B2
(45) Date of Patent: Apr. 16, 2019

(54) METHOD FOR MAKING A VEHICLE TIRE

(71) Applicant: Continental Reifen Deutschland GmbH, Hannover (DE)

(72) Inventors: Stefan Linne, Wedemark (DE); Sebastian Reitmann, Hagenburg (DE)

(73) Assignee: Continental Reifen Deutschland GmbH, Hannover (DE)

( * ) Notice: Subject to any disclaimer, the term of this patent is extended or adjusted under 35 U.S.C. 154(b) by 294 days.

(21) Appl. No.: 14/882,178

(22) Filed: Oct. 13, 2015

(65) Prior Publication Data

US 2016/0031174 A1 Feb. 4, 2016

Related U.S. Application Data

(63) Continuation of application No. PCT/EP2014/052200, filed on Feb. 5, 2014.

(30) Foreign Application Priority Data

Apr. 11, 2013 (DE) ........................ 10 2013 103 629

(51) Int. Cl.
*B29D 30/26* (2006.01)
*B29D 30/30* (2006.01)
(Continued)

(52) U.S. Cl.
CPC ..... *B29D 30/2607* (2013.01); *B29D 30/3014* (2013.01); *B29D 30/32* (2013.01); *B29D 30/72* (2013.01)

(58) Field of Classification Search
CPC .............. B29D 30/005; B29D 30/1614; B29D 30/2607; B29D 30/3014; B29D 30/72; B29D 2030/086; B29D 2030/2414; B29D 2030/2664; B29D 2030/2607
See application file for complete search history.

(56) References Cited

U.S. PATENT DOCUMENTS 2,971,562 A * 2/1961 Hollis ................. B29D 22/023
156/132
3,645,826 A * 2/1972 Henley ............... B29D 30/247
156/401
(Continued)

FOREIGN PATENT DOCUMENTS

DE 10 2004 008 306 A1 9/2005
DE 10 2011 050 454 * 11/2012 ............. B29D 30/32
(Continued)

OTHER PUBLICATIONS

Machine generated English language translation of JP 2004-122658 (original document dated Apr. 2004) (Year: 2004).*
(Continued)

*Primary Examiner* — Timothy Kennedy
(74) *Attorney, Agent, or Firm* — Walter Ottesen, P.A.

(57) ABSTRACT

The invention is directed to a method for making a vehicle tire having a tire carcass defining an axial center, a first and a second tire bead, a tire belt and a tread. The carcass is completed on a carcass drum wherein the carcass drum is free of sidewalls. The tire carcass is removed from the carcass drum and moved to a transfer position for arranging sidewalls. The sidewalls are arranged on sidewall drums on sides of the carcass. The sidewall drums are moved in axial direction toward the axial center of the tire carcass. The sidewall drums with the sidewalls are expanded and connected to the tire carcass. Thereafter, the sidewall drums are collapsed and moved outward and the tire carcass is released for further transport. The carcass and the attached sidewalls are transferred to a shaping drum where the tire carcass with the sidewalls is shaped.

8 Claims, 3 Drawing Sheets

(51) Int. Cl.
B29D 30/72 (2006.01)
B29D 30/32 (2006.01)

(56) References Cited

U.S. PATENT DOCUMENTS

| | | | | |
|---|---|---|---|---|
| 5,213,651 | A * | 5/1993 | Fukamachi | B29D 30/20 156/111 |
| 6,475,319 | B1 | 11/2002 | Akiyama | |
| 2002/0108716 | A1* | 8/2002 | Lacagnina | B29D 30/36 156/416 |
| 2005/0211366 | A1* | 9/2005 | Ogawa | B29D 30/1635 156/117 |
| 2007/0187016 | A1* | 8/2007 | Ogawa | B29D 30/20 152/517 |
| 2007/0284029 | A1 | 12/2007 | Lacagnina | |
| 2010/0212812 | A1* | 8/2010 | Ogawa | B29C 47/0021 156/123 |
| 2013/0206321 | A1 | 8/2013 | Grashuis et al. | |

FOREIGN PATENT DOCUMENTS

| | | | | |
|---|---|---|---|---|
| JP | 58-72438 | * | 4/1983 | B29H 17/00 |
| JP | 59-137025 U | | 9/1984 | |
| JP | 2000-296563 | * | 10/2000 | B29D 30/24 |
| JP | 2004-122658 | * | 4/2004 | B29D 30/30 |
| KR | 10-2006-0095809 | * | 11/2007 | B29D 30/18 |
| WO | 2012/156146 A1 | | 11/2012 | |

OTHER PUBLICATIONS

Machine generated English language translation of DE 10 2011 050 454 (Original document dated Jan. 2011) (Year: 2011).*
Machine generated English language translation of KR 10-2006-0095809 (original document dated Nov. 2007) (Year: 2007).*
Machine generated English language translation of JP 2000-296563 (original document dated Oct. 2000) (Year: 2000).*
Machine generated English language translation of JP 58-72438 (original document dated Apr. 1983) (Year: 1983).*
International Search Report dated May 8, 2014 of international application PCT/EP2014/052200 on which this application is based.

* cited by examiner

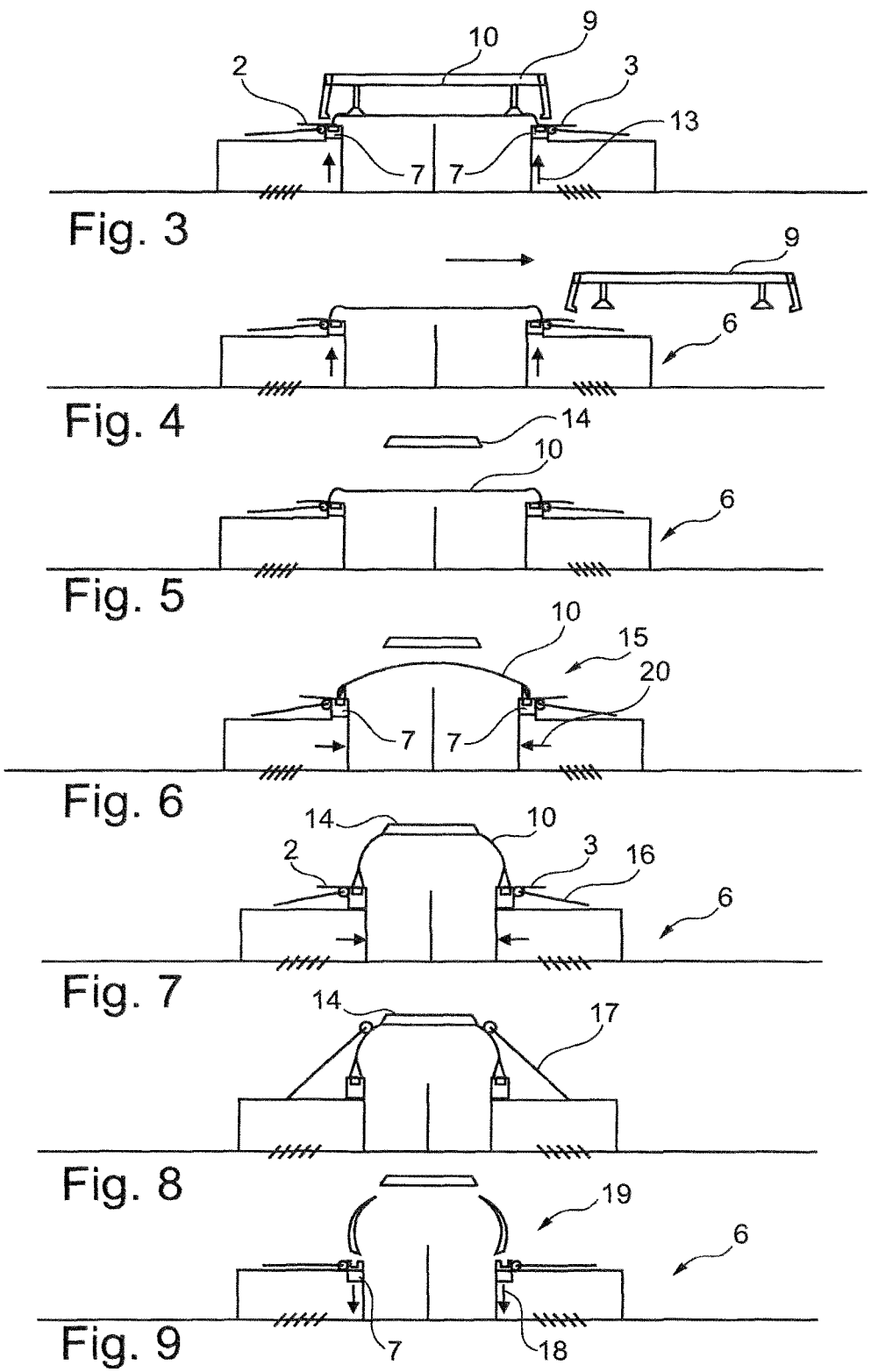

METHOD FOR MAKING A VEHICLE TIRE

CROSS REFERENCE TO RELATED APPLICATIONS

This application is a continuation application of international patent application PCT/EP2014/052200, filed Feb. 5, 2014, designating the United States and claiming priority from German application 10 2013 103 629.5, filed Apr. 11, 2013, and the entire content of both applications is incorporated herein by reference.

FIELD OF THE INVENTION

The invention relates to a method for making a vehicle tire.

BACKGROUND OF THE INVENTION

In the case of conventional vehicle tires, it is known to turn up the insert in the tire bead around a bead core. As a result, the insert or the carcass ply is firmly anchored in the tire bead. Such conventional vehicle tires are produced by the inner layer and the inserts first being arranged as wide material plies on a tire building drum. Subsequently, the bead core is placed onto the insert and the end of the insert is turned up around the core. In the case of conventional tire production, in one method step the end of the insert is turned up around the bead core from the inner side of the tire. In a two-stage method for producing vehicle tires, the tire carcass is built up on a separate carcass drum. Such a carcass drum is generally of a relatively complex construction.

In the case of the conventional tire building methods, both sidewalls are wrapped around on the carcass drum. Subsequently, the tire carcass with the already applied sidewalls is moved to the shaping drum. A disadvantage of this conventional method is that certain tire constructions cannot be realized.

SUMMARY OF THE INVENTION

It is an object of the invention to provide an improved method for making vehicle tires.

The method is also intended to allow special tire constructions to be realized and to optimize the cycle time for the production of the tire blank.

The object is, for example, achieved by a method having the following steps:
a) completing a tire carcass on a carcass drum, no tire building parts in the form of sidewalls being placed on the carcass drum,
b) removing the tire carcass from the carcass drum by a carcass transfer unit,
c) moving the carcass transfer unit with the tire carcass to a transfer position for arranging two sidewalls, the two sidewalls being arranged on both sides of the tire carcass in an axial direction on a separate first sidewall drum and second sidewall drum respectively,
d) moving the first and second sidewall drums in an axial direction toward the axial center of the tire carcass, the sidewalls being arranged on the sidewall drums coaxially in relation to the tire beads of the tire carcass and with a predetermined placement gauge,
e) expanding the first sidewall drum with the first sidewall, the first sidewall, which is lying against the first sidewall drum, being connected to the coaxially positioned tire carcass in the region of the first tire bead by way of the expansion movement, and
f) expanding the second sidewall drum with the second sidewall, the second sidewall, which is lying against the second sidewall drum, being connected to the coaxially positioned tire carcass in the region of the second tire bead by way of the expansion movement,
g) collapsing the sidewall drums and moving the first and second sidewall drums outward in an axial direction, the tire carcass being released for further transport,
h) moving the carcass transfer unit with the tire carcass and the attached sidewalls so as to be coaxial in relation to a shaping drum,
i) transferring the tire carcass from the carcass transfer unit to the shaping drum,
j) moving the carcass transfer unit away from the shaping drum,
k) shaping the tire carcass with the sidewalls attached on both sides, the sidewalls being turned up by a turning-up mechanism to the sides of the tire carcass and the tire carcass being brought together as one with the coaxially arranged belt-tread assembly,
l) completing the tire blank by further steps.

One advantage of the invention can be seen in particular as being that a vehicle tire can be produced by the method in a simple way.

The method likewise makes it possible to produce special tire constructions that were previously not possible with the conventional tire building methods. These tire constructions include in particular vehicle tires in which the upper end of the sidewalls or all the sidewall components end over the side regions of the tread. This type of tire construction is made possible by the sequence of the method steps according to the invention as, for example, described above. It is significant there that the sidewall is not applied on the carcass drum, but only on the shaping drum. A further advantage is that the overall cycle time for producing the vehicle tire or tire blank is optimized.

The two sidewall drums are not coupled to the carcass drum or to the shaping drum. As a result, these sidewall drums do not take up any space in the region of the carcass drum or the shaping drum. A further advantage is that this arrangement allows the movements of the sidewall drums to be controlled better.

The fact that, in the transfer position, the sidewall drums are positioned on both sides of the tire carcass means that the sidewalls can be arranged more easily on the tire beads of the tire carcass. Furthermore, the placement gauge, which is determined by the distance of the sidewall drums from one another, can be freely set. This variability is necessary to allow different tire dimensions to be produced. A further advantage is that, after stitching the sidewalls to the tire carcass, the sidewall drums can be more easily brought back into their starting position again. In the case of known methods, the tire carcass with the attached sidewalls is moved away laterally over both sidewall drums, whereby for example partial regions of the sidewalls may remain hanging on the sidewall drums.

It is provided in an advantageous embodiment of the invention that, before step c), the sidewalls are prefabricated on the first and second sidewall drums. As a result, the overall cycle time for producing the tire blank is shortened.

It is provided in a further advantageous embodiment of the invention that steps e) and f) are performed substantially at the same time, whereby both sidewalls are attached to the tire beads of the tire carcass at the same time. In this way, the cycle time is significantly reduced.

It is provided in a further advantageous embodiment of the invention that the two sidewall drums are each arranged on a separate drum shaft.

It is provided in a further advantageous embodiment of the invention that the drum shafts for the sidewall drums are arranged on an L-shaped carrier system.

The L-shaped carrier system has the effect that the sidewall drums attached thereto are held with great stability.

It is provided in a further advantageous embodiment of the invention that, in step d), the sidewall drums are moved by way of a carriage system in an axial direction to a predetermined placement gauge, at least one carriage mounting being arranged under the L-shaped carrier system. The carriage mounting allows the sidewall drums to be brought into the respective required position at a high speed.

It is provided in a further advantageous embodiment of the invention that the sidewall drums are each driven by a separate drive, a drive for the diameter adjustment and a drive for the drum rotation being respectively provided.

The separate drives allow the movement of the sidewall drums to be controlled independently of one another.

It is provided in a further advantageous embodiment of the invention that the two sidewall drums with the L-shaped carrier system are arranged on a movable plate.

As a result, the L-shaped carrier systems are arranged on a stable base.

It is provided in a further advantageous embodiment of the invention that, before step d), the two sidewall drums with the L-shaped carrier system are respectively positioned next to the tire carcass by a second rail system for a forward movement perpendicularly to the axial direction of the tire carcass. This allows the sidewall drums to be moved forward at a high speed, in order that the tire carcass with the attached sidewalls can be moved further.

It is provided in a further advantageous embodiment of the invention that, before step d), the tire carcass is positioned by the carcass transfer unit between the two sidewall drums from above.

In the case of this embodiment, the sidewall drums would not move forward to release the tire carcass again. The transporting away of the tire carcass with the attached sidewalls is performed by the carcass transfer unit first being moved in the upward direction. Subsequently, the carcass transfer unit would be transported further toward the shaping drum.

It is provided in a further advantageous embodiment of the invention that, after step d), the inner overhanging sidewall end is turned up on the inner side of the tire carcass by an additional turning-up device on the sidewall drums.

In this way there is no need for the turning up of the inner overhanging sidewall end on the inner side of the tire carcass on the shaping drum.

It is provided in a further advantageous embodiment of the invention that, in steps d) and e), the sidewalls are connected to the tire carcass by way of an expansion in the radial direction.

In this way, a precise transfer of the sidewalls to the tire carcass is performed.

It is provided in a further advantageous embodiment of the invention that, in step a), the tire carcass is prefabricated on the carcass drum with a core and a ply turnup.

In this way, the overall cycle time is reduced. The tire carcass with cores and a ply turnup are represented in particular in FIG. 1.

It is provided in a further advantageous embodiment of the invention that, in step a), the tire carcass is prefabricated on the carcass drum in the form of a flat tube without a ply turnup. In the case of this variant, no ply turnup is performed on the carcass drum. The tire carcass is transferred to the shaping drum in the form of a flat tube. In the case of this variant, the ply turnup of the carcass insert is performed together with the turning up of the sidewalls.

It is provided in a further advantageous embodiment of the invention that, in step k), the sidewall is turned up before the transfer of the belt-tread assembly by way of the shaping drum. This makes it possible to realize a certain tire construction in which the sidewall can be arranged under the belt-tread assembly.

It is provided in a further advantageous embodiment of the invention that, in step k), the sidewall is turned up after the transfer of the belt-tread assembly by way of the shaping drum, it being possible for part of the sidewall to be arranged over the tread.

This makes it possible to arrange the upper part of the sidewall over the belt-tread assembly.

It is provided in a further advantageous embodiment of the invention that further tire building parts are applied on the sidewall drums apart from the sidewall. Bead reinforcers in the form of rubberized textile or steel cord plies come into consideration for example as further tire building parts. The placing of these further tire building parts on the sidewall drum reduces the overall cycle time.

It is provided in a further advantageous embodiment of the invention that the turning-up mechanisms on the shaping drum are formed in the form of a multiplicity of roller levers.

In this way, the sidewalls are turned up on the tire carcass with high precision and speed.

BRIEF DESCRIPTION OF THE DRAWINGS

An embodiment of the method of the invention will now be described with reference to the drawings wherein:

FIG. 3 shows a method step in which segments of the shaping drum expand in a radial direction;

FIG. 4 shows a method step in which the carcass transfer unit is moved away from the shaping drum;

FIG. 5 shows a method step in which the belt-tread assembly is positioned coaxially in relation to the shaping drum;

FIG. 6 shows a method step in which the shaping operation is initiated;

FIG. 7 shows the tire carcass being brought together as one with the coaxially arranged belt-tread assembly;

FIG. 8 shows a method step in which the sidewalls have already been correspondingly turned up at the tire carcass; and, FIG. 9 shows a method step in which the segments 7 move in a radial direction

DESCRIPTION OF THE PREFERRED EMBODIMENTS OF THE INVENTION

Figure 1:
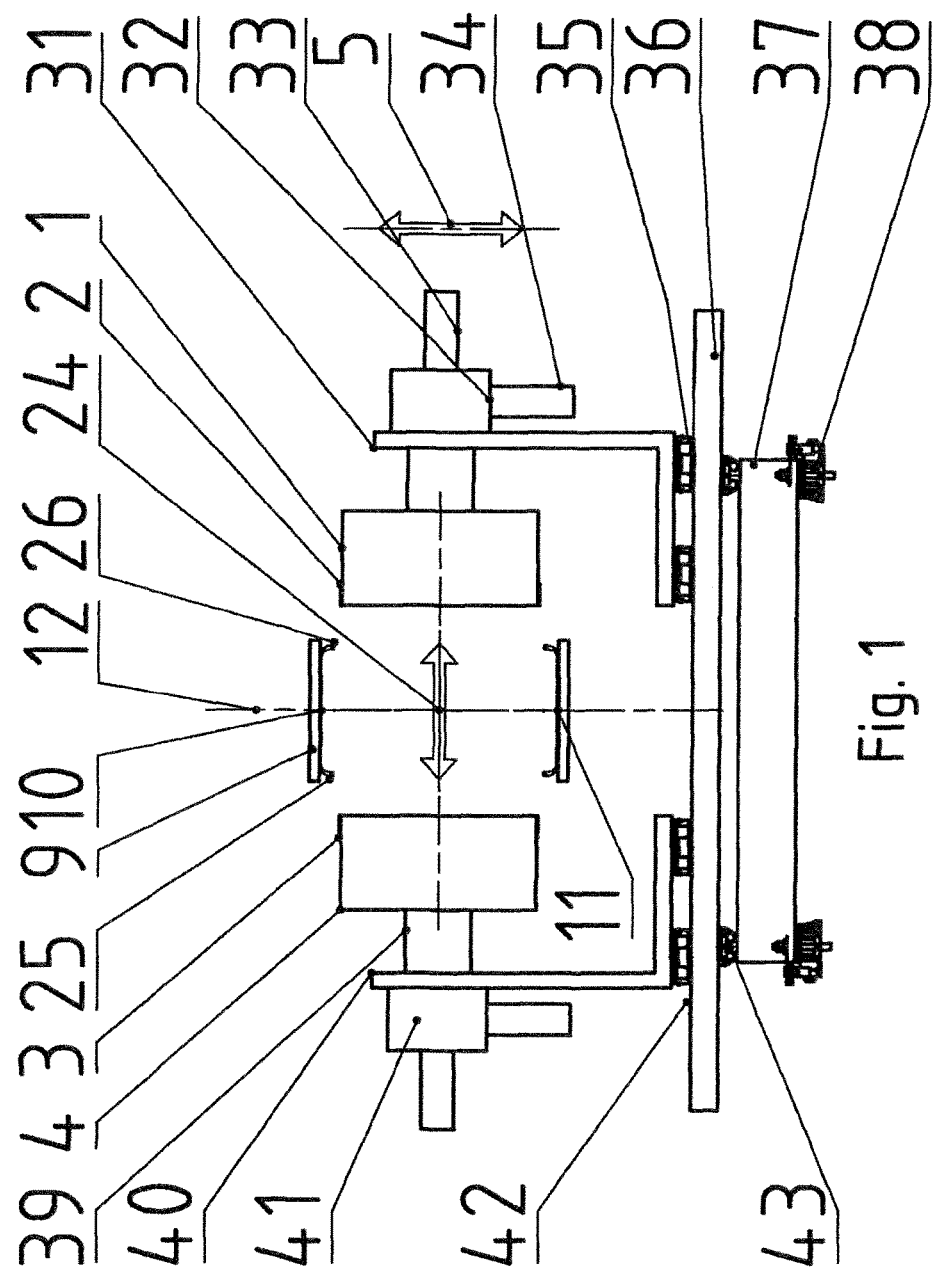
FIG. 1 is a radial sectional view of the first and second sidewall drums.

FIG. 1 shows the first and second sidewall drums 1 and 4 in a radial sectional view. On the sidewall drums 1 and 4, the left-hand sidewall 3 and the right-hand sidewall 2 are wrapped around in advance in the form of two separate rings. The carcass transfer unit 9 holds the tire carcass 10. The tire carcass 10 was produced in previous method steps on a carcass drum that is not represented. In the case of this embodiment, the tire carcass 10 already has a ply turnup 11 with a conventional tire core. The tire carcass 10 may be held in both regions of the tire bead by a holding arrangement of the carcass transfer units 9 (not shown).

Figure 2:
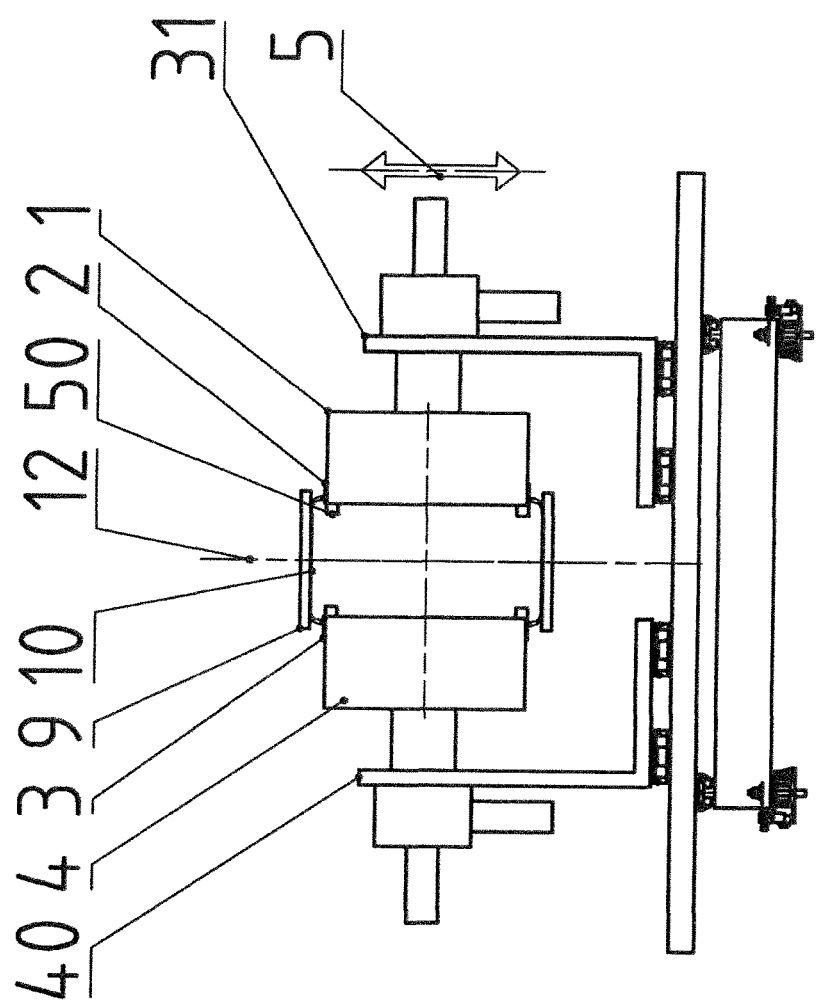
FIG. 2 shows a method step in which the sidewall drums have been expanded.

After the carcass transfer unit 9 has brought the tire carcass 10 into the position shown, the two sidewall drums 1 and 4 with the two L-shaped carrier systems 31 and 40 are positioned laterally next to the tire carcass 10. The two sidewall drums 1 and 4 are connected by way of a drum shaft 30 and 39 to the L-shaped carrier system 31 and 40 respectively. Each sidewall drum 1 and 4 has a drive of its own, with a gearbox 32 and a drive 33 for the diameter adjustment and a drive 34 for the drum rotation. The two L-shaped carrier systems 31 and 40 have respective sets of carriage mountings 35 as shown in FIGS. 1 and 2. The carriage mountings allow both sidewall drums 1 and 4 to be moved back and forth in an axial direction 24. The carriage mountings 35 are in turn arranged on a plate 36. On the underside of the plate 36, there is a carriage mounting 37 and 43 for a rail system, which makes the plate with the L-shaped carrier systems 31 and 40 movable in the forward direction, perpendicularly to the axial direction 24. This movement is necessary in order to release the tire carcass for further transport after the attachment of the sidewalls. In the case of this embodiment, the ply turnup 11 on the tire carcass 10 has already been carried out. In the next method step (not shown), the two sidewall drums 1 and 4 are moved toward one another in an axial direction 24 and positioned coaxially under the tire carcass 10 in the region of the sidewalls 2 and 3. In this method step, the transfer of the sidewalls 2 and 3 to the tire beads of the tire carcass 10 is prepared.

FIG. 2 shows the method step in which the sidewall drums 1 and 4 have been expanded, whereby the placed sidewalls 2 and 3 are attached to the tire carcass 10. Subsequently, the sidewall drums 1 and 4 collapse again, whereby the tire carcass 10 with the attached sidewalls 2 and 3 is released again.

In the next method step, the two sidewall drums 1 and 4 are moved out on both sides of the tire carcass 10 and brought into the starting position, as shown in FIG. 1. Thereafter, the two sidewall drums 1 and 4 are moved forward perpendicularly to the axial axis 24, in order that the tire carcass 10 with the attached sidewalls 2 and 3 can be transported further to the shaping drum.

Likewise shown in FIG. 2 is a further embodiment, which includes an additional turning-up device 50, which is arranged at corresponding ones of the sidewall drums 1 and 4 as shown. With the additional turning-up device 50, the turning up of the inner overhanging sidewall on the inner side of the tire carcass 10 is performed. The turning-up device may, for example, include a compliant element, which folds the sidewall ends in the upward direction during the expansion of the sidewall drum. It is also conceivable that the turning-up mechanism includes segments that are expanded against the sidewall ends.

The further transport to a shaping drum is subsequently performed, as shown in FIG. 3.

FIG. 3 shows the method step in which the segments 7 of the shaping drum 6 expand in a radial direction 13. As a result, a transfer of the tire carcass 10 with the sidewalls 2 and 3 to the shaping drum is performed.

FIG. 4 shows the method step in which the carcass transfer unit 9 is moved away from the shaping drum 6.

FIG. 5 shows the method step in which the belt-tread assembly 14 is positioned coaxially in relation to the shaping drum 6.

FIG. 6 shows the method step in which the shaping operation is initiated. During the shaping operation, the two segments 7 move toward one another in an axial direction 20, the tire carcass 10 being correspondingly made to bulge radially outwards.

FIG. 7 shows the tire carcass 10 being brought together as one with the coaxially arranged belt-tread assembly 14. In the case of this method step, the roller levers 16 of the shaping drum 6 are still in a waiting position.

FIG. 8 shows the method step in which the sidewalls have already been correspondingly turned up at the tire carcass. This turning up of the sidewalls is performed with the roller levers 17, which spread apart and thereby turn up the placed sidewalls 2 and 3 on the tire carcass. Since the belt-tread assembly 14 has already been brought together as one with the tire carcass 10, the upper part of the sidewalls can be arranged over the belt-tread assembly 14.

FIG. 9 shows the method step in which the segments 7 move in a radial direction 18. The completed tire blank 19 is released in this method step, and can subsequently be removed from the shaping drum 6. The completion of the vehicle tire is subsequently performed by a conventional method. In the case of a variant, the sidewall is turned up before the transfer of the belt-tread assembly by way of the shaping drum. This makes it possible to arrange the upper parts of the sidewall under the belt-tread assembly.

It is understood that the foregoing description is that of the preferred embodiments of the invention and that various changes and modifications may be made thereto without departing from the spirit and scope of the invention as defined in the appended claims.

LIST OF DESIGNATIONS

Constitutes Part of the Description

1 Right-hand or first sidewall drum
2 Right-hand or first sidewall
3 Left-hand sidewall
4 Left-hand or second sidewall drum
5 Radial direction
6 Shaping drum
7 Segments for core clamping
8 Radial expansion of the sidewall drum
9 Carcass transfer unit
10 Tire carcass with ply turnup
11 Ply turnup with core
12 Axial center of the tire carcass
13 Radial expansion of the sidewall drum
14 Belt-tread assembly
15 Shaping operation
16 Roller lever
17 Roller lever during turning up of the sidewalls
18 Radial moving in of the segments
19 Completed tire blank
20 Axial moving together of the segments during the shaping operation
21 Axial line of symmetry
22 Distance between the sidewall drums
23 Axial moving in of the sidewall drums
24 Axial direction
25 Left-hand bead
26 Right-hand bead
30 Drum shaft
31 L-shaped carrier system
32 Gear mechanism
33 Drive for diameter adjustment
34 Drive for drum rotation
35 Carriage mounting for rail system 36 Movable plate
37 Carriage mounting for second rail system
38 Baseplate
39 Drum shaft
40 L-shaped carrier system
41 Gear mechanism
42 Carriage mounting for rail system
43 Carriage mounting for second rail system
50 Additional turning-up device at the sidewall drum

What is claimed is:

1. A method for making a vehicle tire having a tire carcass defining a longitudinal axis and having an axial center on the longitudinal axis, a first and a second tire bead having respective cores, a tire belt and a tread, the method comprising the steps of:
   a) completing the tire carcass on a carcass drum, wherein the carcass drum is free of tire components in the form of sidewalls;
   b) removing the tire carcass away from the carcass drum via a carcass transfer unit holding the tire carcass;
   c) moving the carcass transfer unit with the tire carcass to a transfer position whereat first and second sidewall drums are disposed along a common axis with first and second sidewalls arranged on corresponding ones of the first and second sidewall drums and thereafter moving the carcass transfer unit to a position between the first and second sidewall drums, wherein the first and second sidewall drums are mounted on respective first and second drum shafts, the first drum shaft being arranged on a first L-shaped carrier system and the second drum shaft being arranged on a second L-shaped carrier system;
   d) positioning the first and the second side wall drums next to the tire carcass by operation of a first carriage system providing forward movement of the first and second side wall drums in the radial direction with respect to the tire carcass;
   e) moving the first and second sidewall drums in an axial direction toward the center of the tire carcass, the first and second sidewalls being further arranged on corresponding ones of the sidewall drums coaxially in relation to the tire beads of the tire carcass, the first and second sidewall drums being moved in the axial direction by operation of a second carriage system arranged under the first and second L-shaped carrier systems;
   f) expanding the first sidewall drum with the first sidewall, wherein the first sidewall, which is lying against the first sidewall drum, is connected to the coaxially positioned tire carcass in the region of the first tire bead by way of the expansion movement;
   g) expanding the second sidewall drum with the second sidewall, wherein the second sidewall, which is lying against the second sidewall drum, is connected to the coaxially positioned tire carcass in the region of the second tire bead by way of the expansion movement of the second sidewall drum;
   h) collapsing the sidewall drums and moving the first and second sidewall drums outward in the axial direction, the tire carcass being released for further transport;
   i) moving the carcass transfer unit with the tire carcass and the attached sidewalls toward a shaping drum;
   j) transferring the tire carcass from the carcass transfer unit to the shaping drum;
   k) moving the carcass transfer unit away from the shaping drum;
   l) shaping the tire carcass with the sidewalls attached on both sides, the sidewalls being turned up by respective turning-up mechanisms laterally on the tire carcass and the tire carcass being brought together as one with the coaxially arranged belt-tread assembly; and,
   m) completing the tire blank.

2. The method of claim 1, wherein said steps e) and f) are performed substantially simultaneously, whereby the first and the second side walls are attached to the tire beads of the tire carcass at the same time.

3. The method of claim 1, wherein the first side wall drum is driven by a first drive unit which includes a drive for diameter adjustment and a drive for drum rotation and the second side wall drum is driven by a second drive unit separate from the first drive unit; and, the second drive unit includes a drive for diameter adjustment and a drive for drum rotation.

4. The method of claim 1, wherein the first and the second side wall drums with the corresponding first and second L-shaped carrier systems are arranged on a movable plate.

5. The method of claim 1, further comprising the step of, after step d), turning up an inner overhanging sidewall end on an inner side of the tire carcass via an additional turning-up mechanism on the sidewall drums.

6. The method of claim 1, wherein, in step d) and step e), the first and second side walls are each connected to the tire carcass via an expansion in the radial direction.

7. The method of claim 1, wherein, in step a), the tire carcass is prefabricated on the carcass drum with the respective cores and a ply turnup.

8. The method of claim 1, wherein, in step k), the first and the second side walls are turned up after the transfer of the belt-tread assembly via the shaping drum, part of each of the first and second side walls being placeable over the tread.

* * * * *